United States Patent [19]
Lesage et al.

[11] Patent Number: 5,645,374
[45] Date of Patent: Jul. 8, 1997

[54] METHOD FOR DEHALOGENATING CONTAMINATED WATER AND SOIL

[75] Inventors: Suzanne Lesage, Hamilton; Susan Jean Brown, Cambridge; Kelly Rose Millar, Mississauga, all of Canada

[73] Assignee: Her Majesty the Queen in right of Canada, as represented by the Minister of the Environment, Hull, Canada

[21] Appl. No.: 563,038

[22] Filed: Nov. 27, 1995

[51] Int. Cl.$^6$ .............................. B09C 1/08; C02F 1/68; C02F 1/70
[52] U.S. Cl. .................... 405/128; 210/747; 210/757; 210/908; 588/206; 588/248; 588/249
[58] Field of Search ............... 405/128; 210/747, 210/757, 763, 908, 909; 588/206, 248, 249

[56] References Cited

U.S. PATENT DOCUMENTS

| | | | |
|---|---|---|---|
| 3,252,892 | 5/1966 | Gleim | 208/206 |
| 5,004,551 | 4/1991 | Sublette | 210/763 |
| 5,032,291 | 7/1991 | Sublette | 210/757 |
| 5,051,030 | 9/1991 | Saha et al. | 405/128 |
| 5,152,844 | 10/1992 | Wilwerding et al. | 405/128 X |
| 5,197,823 | 3/1993 | Cutshall et al. | 405/128 |
| 5,345,031 | 9/1994 | Schwartz et al. | 588/206 |
| 5,345,032 | 9/1994 | Marks et al. | 588/207 |
| 5,414,201 | 5/1995 | Greene | 588/206 |

FOREIGN PATENT DOCUMENTS

| | | |
|---|---|---|
| 2258464 | 10/1993 | United Kingdom . |
| WO93/04206 | 3/1993 | WIPO . |

OTHER PUBLICATIONS

DuPont Speciality Chemicals, Technical Information, Tyzor Organic Titanates, pp. 1–22 (undated).

Suzanne Lesage and Susan Brown, In–Situ Biochemical Degradation of Perchloroethylene Present as Residual DNAPL, Presented at I&EC Special Symposium American Chemical Society, Atlanta, GA, Sep. 27–29, 1993.

Nada Assaf–Anid, Loring Nies, and Timothy M. Vogel, Reductive Dechlorination of Chlorinated Aliphatic and Aromatic Compounds by Vitamin $B_{12}$, Presented before the Division of Environmental Chemistry, American Chemical Society, San Francisco, California, Apr. 5–10, 1992, pp. 489–491.

Primary Examiner—George A. Suchfield
Attorney, Agent, or Firm—James W. Carson

[57] ABSTRACT

A method for dehalogenating contaminated ground water and/or soil where the contaminated area is contacted with a titanium carboxylic acid derivative such as titanium oxalate, titanium citrate or titanium nitriloacetate and a corrin or porphyrin catalyst preferably vitamin B12 compound. The result of contact with the contaminated source is that the compounds reductively dehalogenate the contaminates thereby making it less toxic. This is achieved by making use of the non-toxic reagents, namely the corrin or porphyrin catalyst such as vitamin B12 and the titanium carboxylic acid derivative.

13 Claims, 5 Drawing Sheets

METHOD FOR DEHALOGENATING CONTAMINATED WATER AND SOIL

FIELD OF THE INVENTION

The present invention relates to a method for dehalogenating industrial effluent, ground water and/or soil which have been contaminated with halogenated organic compounds and more particularly, the present invention relates to a catalytic dehalogenation process.

BACKGROUND OF THE INVENTION

Volatile halogenated organic compounds can be removed from the water by physical methods such as air stripping or filtration through sorptive media such as charcoal. These methods are phase-transfer processes and the off gases or the charcoal must be subsequently treated. Because of the low aqueous solubility of many compounds removal from the subsurface by pumping water has proven to be ineffective.

In addition, some anaerobic bacteria have been demonstrated to biodegrade many of the above-mentioned compounds by co-metabolism. This means that the bacteria do not derive any energy from the process, therefore, they must be fed an alternate carbon source. The rate of reaction is usually slow with a half-life of days to weeks and as a second drawback, the bacteria are susceptible to toxic concentrations of the chemicals.

Recently, certain biochemicals have been shown to mimic the bacterial process in vitro. Examples of such compounds are hematin and vitamin B12. Vitamin B12 belongs to the class of compounds called the corrinoids, a multiple pyrrole ring system with a chelated metal (ie. Fe, Ni, Co) in the centre. Corrinoids have been very effective in reductive dechlorination of chlorinated organic compounds in the absence of a cell or protein structure, which is often thought to be essential for correct alignment of the substrate with the catalytic centre of the enzyme. Corrinoids in general, and vitamin B12 as an example, are capable of reductively dechlorinating chlorofluorohydrocarbons, chlorinated aliphatic hydrocarbons and aromatic hydrocarbons. However vitamin B12 has not been used in the in-situ treatment of contaminated soil or ground water.

U.S. Pat. No. 5,044,551, issued Apr. 2, 1991 provides a method for treating water or solids contaminated with at least one chlorinated phenol and involves the oxidation of the phenol in the presence of a catalytic mount of a corrin or porphyrin metal complex. One example of the porphyrin metal complex is given as an iron ion ($Fe^{3+}$). The method set forth in this patent is limited to an oxidation process. An oxidation process requires the presence of an easily oxidized functional group imparted by the presence of an oxygen atom, as in phenols, a sulphur atom or a nitrogen atom. It is the oxygen that is bound to the catalyst and accordingly, the process of the '551 patent would not be applicable to halogenated hydrocarbons which do not contain hetero atoms (O, N, or S) which make them susceptible to oxidation.

Other prior art references which are generally related to catalytic degradation of compounds includes U.S. Pat. Nos. 3,252,892, issued May 24, 1966, to Gleim and U.S. Pat. No. 5,051,030, issued Sep. 24, 1991, to Saha et at.

In view of what has been previously proposed in the prior art, it is clear that a need exists for a process which can proceed to dehalogenate contaminated ground water or effluent and/or soil contaminated with halogenated organic compounds and which does not further add environmentally hazardous compounds in the process of dehalogenating the halogenated compounds. The present invention is directed to satisfying this need.

SUMMARY OF THE INVENTION

One object of the present invention is to provide an improved process by which halogenated organic compounds present in industrial effluent, ground water and/or soil may be dehalogenated.

A further object of the present invention is to provide a method of in-situ anaerobic treatment of effluent, ground water or soil contaminated with halogenated organic compounds, by contacting the soil, effluent or ground water with a reduced titanium mixture in the presence of a catalytic amount of corrin or porphyrin catalyst to reductively dehalogenate the organic compounds present in the soil, effluent or the ground water.

A further object of the present invention is to provide a method of on-site generation of a stable reduced titanium mixture.

A further object of the present invention is to provide a means for immobilization of the corrin or porphyrin catalyst when treating industrial effluent or contaminated ground water.

Accordingly the present invention provides a method of in-situ anaerobic treatment of soil contaminated with undissolved halogenated organic compounds, said method comprising: contacting the soil with a reduced titanium mixture preferably a titanium carboxylic acid derivative such as titanium(III) oxalate, titanium nitriloacetate or titanium citrate, in the presence of a catalytic amount of corrin or porphyrin catalyst to reductively dehalogenate the organic contaminants. The catalyst may be a corrin selected from the group consisting of cyanocobalamin (ie. vitamin B12), aquocobalamin, methylcobalamin, adenosylcobalamin, (cyanoaquo)cobinamide, (methylaquo)cobinamide and (cyanoaquo)trimethylbenzimidazoylcobamide or a porphyrin selected from the group consisting of hemoglobin, heroin, hematin, chlorophyll a, cobalt protoporphyrin, iron protoporphyrin, magnesium protoporphyrin, nickel protoporphyrin, vanadium protoporphyrin and cobalt phthalocyanine. The most preferred catalyst is vitamin B12 because it is effective and readily available. Vitamin B12 is highly water soluble. Its affinity for soil organic matter is lower than that of most halogenated organic compounds. It can, therefore, be used as an effective in-situ treatment of solvents present as a non-aqueous phase in soil or in the subsurface.

The reduced titanium mixture should be stable, non-corrosive and not hazardous to the environment. Titanium citrate has been previously used for reductive dechlorination of halogenated solvents in the laboratory. However titanium citrate is generally prepared from $TiCl_3$, which when shipped in 20% HCl solution is highly corrosive, expensive and difficult to handle. Titanium oxalate on the other hand is very stable and can be maintained in-situ for a period of time of at least 6 months.

Accordingly in another embodiment, the present invention includes a method for the preparation of titanium oxalate on site by applying a solution of oxalic acid to titanium metal, components that may be readily shipped as dry goods. The titanium oxalate solution and corrin or porphyrin catalyst can then be pumped into the soil to reductively dehalogenate the undissolved halogenated organic compounds.

Where titanium oxalate is utilized it is advantageous to also add sodium citrate and sodium carbonate in-situ. The sodium carbonate acts as a buffer to adjust the pH of the feed stream. The sodium citrate interacts with the minerals such as calcium in the soil to help maintain the titanium in solution. Without the sodium citrate the titanium oxalate would react with the minerals in the soil and the titanium would be precipitated.

In another aspect, the present invention also provides a method of reductively dehalogenating ground water or industrial effluent contaminated with halogenated organic compounds. The method can be performed in-situ or above ground and comprises contacting the contaminated ground water or effluent with a reduced titanium mixture, preferably titanium carboxylic acid derivative such as titanium oxalate, titanium citrate or titanium nitriloacetate and then passing the ground water or effluent through a filter bed or porous reactive wall containing a con-in or porphyrin catalyst for reductive dehalogenation of the organic compounds. The catalyst may be a corrin selected from the group consisting of cyanocobalamin (ie. vitamin B12), aquocobalamin, methylcobalamin, adenosylcobalamin, (cyanoaquo) cobinamide, (methylaquo)cobinamide and (cyanoaquo) trimethylbenzimidazoylcobamide or a porphyrin selected from the group consisting of hemoglobin, hemin, hematin, chlorophyll a, cobalt protoporphyrin, iron protoporphyrin, magnesium protoporphyrin, nickel protoporphyrin, vanadium protoporphyrin and cobalt phthalocyanine. The most preferred catalyst is vitamin B12 because it is effective and readily available. Vitamin B12 is however highly water soluble. Accordingly in the treatment of ground water or effluent the vitamin B12 or other corrin or porphyrin catalyst is preferably immobilized on a support. Suitable supports include hydrophobic organic polymers such as styrenedivinyl benzene, XAD resins or Tenax (trademark for 2,6 diphenylene oxide polymer), pure or coated on inorganic solids such as silica sand or graphitized carbon. The coating may be adsorbed or chemically bonded to the inorganic solid. Silica modified with octadecylsilane (known as C18 silica) has been found to a suitable support having good mechanical strength and stability and which releases the catalyst such as vitamin B12 very slowly and hence is active for months. Because it is non-polar, C18 silica also tends to attract most of the organic compounds commonly found as contaminants in ground water providing intimate contact for the reaction to occur on the surface of the support. Advantageously, it is, therefore, possible to achieve very high concentrations of reactant and the catalyst without losing them to the effluent. Other preferred supports include XAD type resin or other modified silica products such as C8 silica or C2 silica.

An advantage of the methods of the present invention over known methods is the fact that the reductive process is much more favourable than the oxidative process in terms of mechanism and application. The reductive process can be conducted anaerobically and accordingly, is particularly suited to subterranean applications or anoxic ground water emerging from it or further, may be employed in sealed vessels. In the reductive process as is practised in the present invention, the substrate itself binds to the catalyst as opposed to the oxidative process where oxygen is bound to the catalyst.

In addition the present invention is applicable to a broad range of compounds, namely, the halogenated hydrocarbons where the halogen atom may comprise fluorine, chlorine, bromine, iodine or any combination of these.

It has been found according to the present invention that the use of the titanium mixtures in combination with the corrin or porphyrin catalyst for use in decontaminating contaminated ground water and/or soil results in a substantial dehalogenation of the halogenated organic compounds and therefore, detoxifies the soil and/or ground water.

The reduced titanium mixture can be any carboxylic acid titanium derivative that is stable and not hazardous to the environment. As noted earlier titanium (III) oxalate is preferred particularly as it is easily prepared in solution from titanium metal and oxalic acid. The addition of other chelating agents such as sodium citrate or nitriloacetate facilitate transport of the solution in some soil environments. The sodium citrate or nitriloacetate help to avoid precipitation of the titanium and maintain it in solution by interacting with the minerals present in the soil, ground water or effluent. There are however restrictions on the use of nitriloacetate because of drinking water regulations.

It has been determined that the microbial biodegradation of halogenated organic contaminants present in soil or sediment, wherein the soil contains a population of microorganisms which are capable of degrading or decomposing the contaminants may be enhanced according to the present invention. The addition to the soil of a dehalogenating composition of reduced titanium and a corrin or porphyrin catalyst results in a much higher rate of dehalogenation than with the microorganisms alone.

To avoid constant injection of titanium into the ground, microbial systems can be provided to recycle (reduce) the titanium in situ. The present invention is fully biocompatible and will not interfere with intrinsic microbial biodegradation, a distinct advantage over the use of surfactants which sterilize the environment necessitating reinoculation of the environment.

Further features of the invention will be described or will become apparent in the course of the following detailed description.

BRIEF DESCRIPTION OF THE DRAWINGS

In order that the invention may be more clearly understood, the preferred embodiments thereof will now be described in detail by way of example, with reference to the accompanying drawings, in which.

DETAILED DESCRIPTION OF THE PREFERRED EMBODIMENTS

Figure 1:
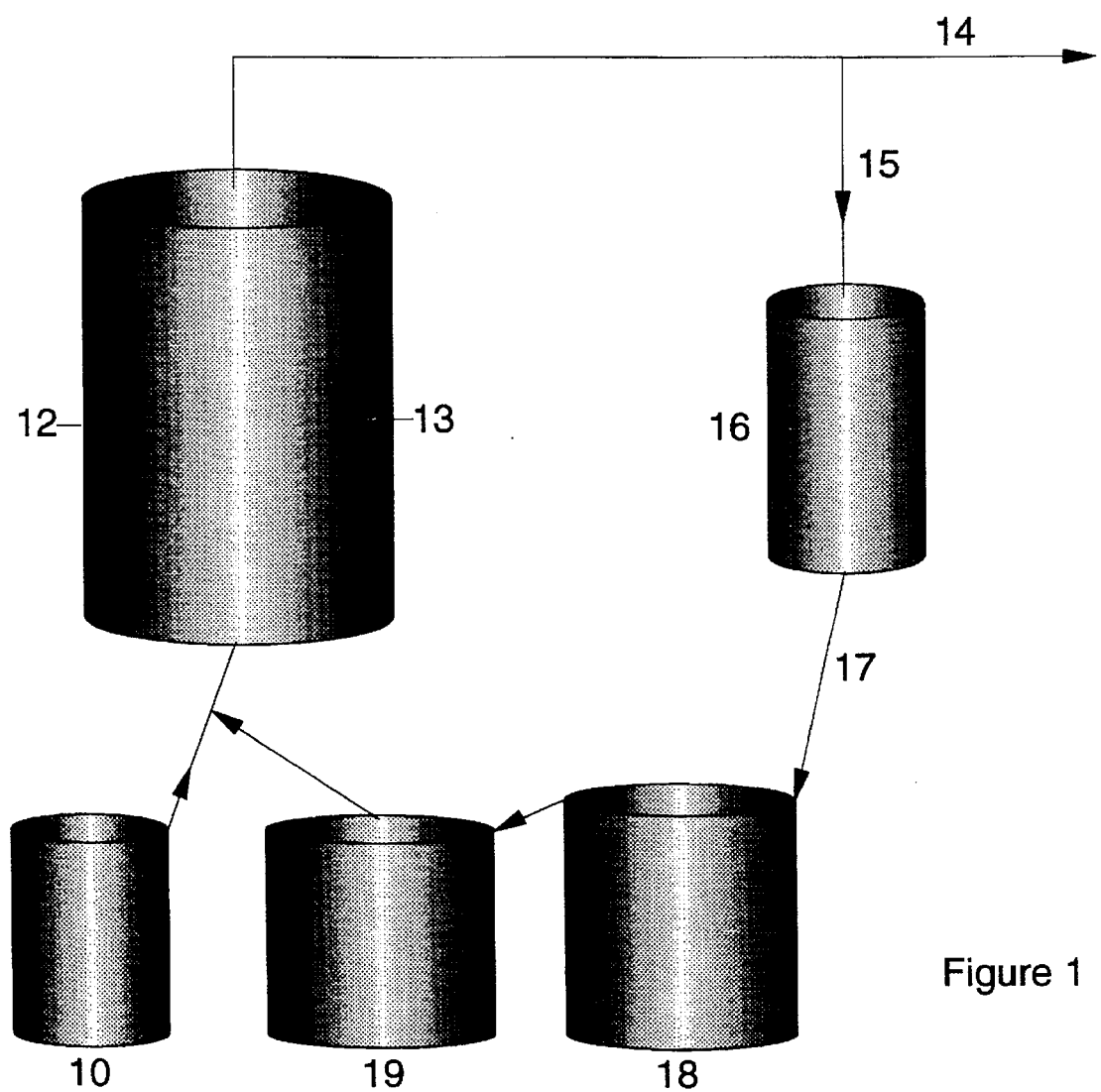
FIG. 1 is a schematic illustration of the process according to one embodiment of the present invention for an above ground application to reductively dehalogenate halogenated organic compounds in ground water or industrial effluent.

Referring now to the drawings and more specifically FIG. 1, shown is a schematic representation of the method of effecting the dehalogenation of ground water or effluent above ground according to one embodiment of the present invention. Initially, a feed solution of the contaminated ground water or effluent, generally represented by numeral 10, may be passed into contact with a main reactor, globally denoted by numeral 12. FIG. 1 is intended to represent a fluid bed reactor but other suitable reactor types may be utilized. Reactor 12 contains a corrin or porphyrin catalyst 13. The catalyst may be a corrin such as cyanocobalamin (ie. vitamin B12), aquocobalamin, methylcobalamin, adenosylcobalamin, (cyanoaquo)cobinamide, (methylaquo) cobinamide and (cyanoaquo) trimethylbenzimidazoylcobamide or a porphyrin such as hemoglobin, hemin, hematin, chlorophyll a, cobalt protoporphyrin, iron protoporphyrin, magnesium protoporphyrin, nickel protoporphyrin, vanadium protoporphyrin and cobalt phthalocyanine. The above list is not exclusive. Any tetra pyrrole ring system with a reduced metal in the centre have the potential to be an effective catalyst in the methods of the present invention. The most preferred catalyst is vitamin B12 because it is effective and readily available. The corrin or porphyrin catalyst may be soluble in water and accordingly is preferably immobilized on a support. Suitable supports include hydrophobic organic polymers such as styrene-divinyl benzene, XAD resins or Tenax, pure or coated on inorganic solids such as silica sand or graphitized carbon. The coating may be adsorbed or chemically bonded to the inorganic solid. Silica modified with octadecylsilane (known as C18 silica) has been found to a suitable support having good mechanical strength and stability and which releases the catalyst such as vitamin B12 very slowly and hence is active for months. Because it is non-polar, C18 silica also tends to attract most of the organic compounds commonly found as contaminants in ground water providing intimate contact for the reaction to occur on the surface of the support. Advantageously, it is, therefore, possible to achieve very high concentrations of reactant and catalyst without losing them to the effluent. Other preferred supports include XAD type resin or other modified silica products such as C8 silica or C2 silica.

A reduced titanium mixture feed 18 preferably a titanium carboxylic acid derivative in solution such as titanium oxalate, titanium citrate or titanium nitriloacetate or the like is added to the feed stream 10. The reduced titanium mixture preferably is generated on-site by for example in the case of titanium oxalate by applying a solution of oxalic acid to titanium metal. The titanium oxalate is much less susceptible to oxidation than titanium citrate and can be kept in the field for months.

It is advantageous to also add a pH adjusting solution 19 into feed stream 10 with the reduced titanium mixture 18. One pH adjusting solution is sodium citrate and sodium carbonate. The sodium carbonate acts as a buffer to adjust the pH of the titanium mixture 18. The reaction will occur at pH above 7 and pH 9 is optimal. The sodium citrate interacts with the minerals such as calcium in the ground water or effluent 10 to help maintain the titanium in solution. Without the sodium citrate the titanium mixture 18 would react with the minerals in the ground water or effluent and be precipitated.

Once the feed solution is passed through reactor 12, any volatile dehalogenated products 14 may be safely vented. The discharged aqueous solution 15 may then be passed into a recycling stage 16 where the oxidized titanium (IV) can be reduced to titanium (III) using for example, a zinc catalyst. The reduced titanium 17 can then be recycled to the titanium mixture 18 and reintroduced to the reactor 12 for further treatments.

Figure 2:
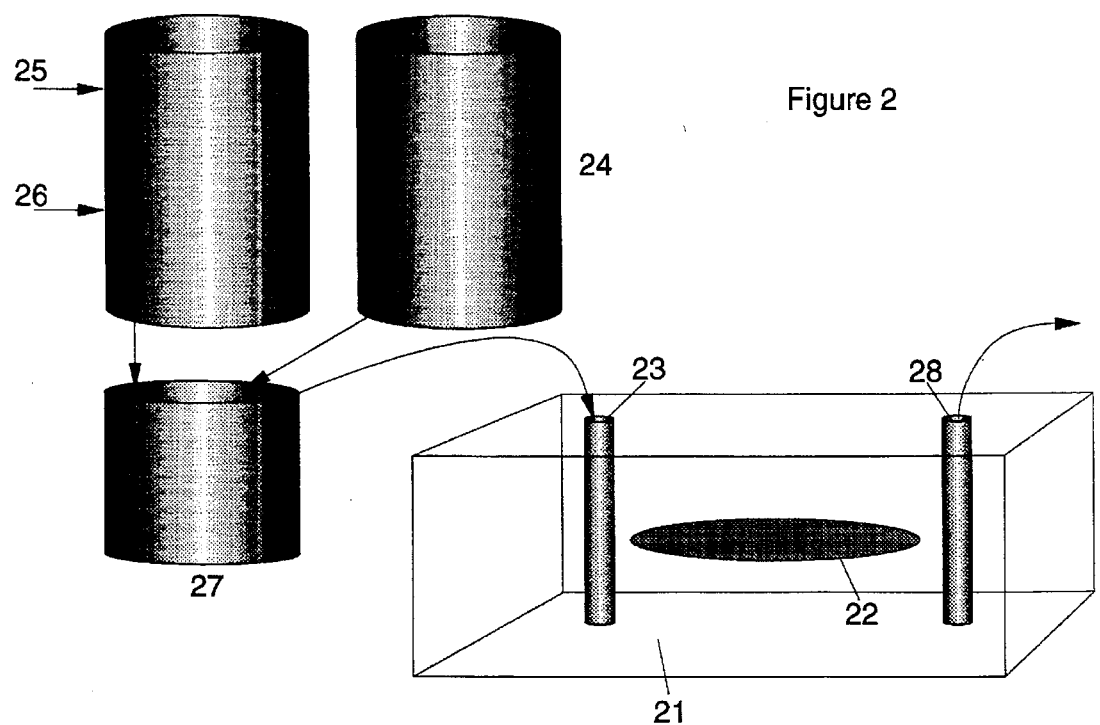
FIG. 2 is a schematic illustration of a method according to the present invention for a subterranean application of the process to reductively dehalogenate dense non-aqueous phase liquids (DNAPL) contaminating the soil.

Turning now to FIG. 2, a further possible embodiment of the present invention is shown for in-situ treatment of contaminated soil. In FIG. 2, numeral 21 represents a parcel of soil contaminated with dense non-aqueous phase liquids (DNAPL) 22. According to the present invention means are provided for introducing a reduced titanium mixture 24 and corrin or porphyrin catalyst 25 into contact with the contaminated soil. In FIG. 2 one or more injection wells 23 are illustrated as the means for introducing the reduced titanium mixture and catalyst into contact with the contaminated soil. In this manner, the injection wells 23 will preferably penetrate through the soil and into the source of contamination. The injection wells 23 may comprise any suitable means for dispensing the titanium mixture into the soil and may include, for example, apertured hollow tubes (not shown) or any other suitable means for dispersing the fluid into the soil.

The reduced titanium mixture 24 is mixed with a pH adjust solution 26 and catalyst 25 in mixing chamber 27. The mixture is then pumped into injection wells 23. The reduced titanium mixture 24 is preferably titanium oxalate or titanium citrate and when contacting the halogenated dense nonaqueous liquids in the presence of the corrin or porphyrin catalyst preferably vitamin B12, the halogenated liquids are reductively dehalogenated. The pH adjusting solution 26 preferably is a solution of sodium citrate and sodium carbonate or the like. The sodium carbonate acts as a buffer to adjust the pH of the titanium mixture 24 to pH above 7. The sodium citrate interacts with the minerals such as calcium in the soil to help maintain the titanium in solution. Without the sodium citrate the titanium mixture 24 would react with the minerals in the soil and be precipitated.

The oxidized titanium may be withdrawn by withdrawal well 28.

Figure 3:
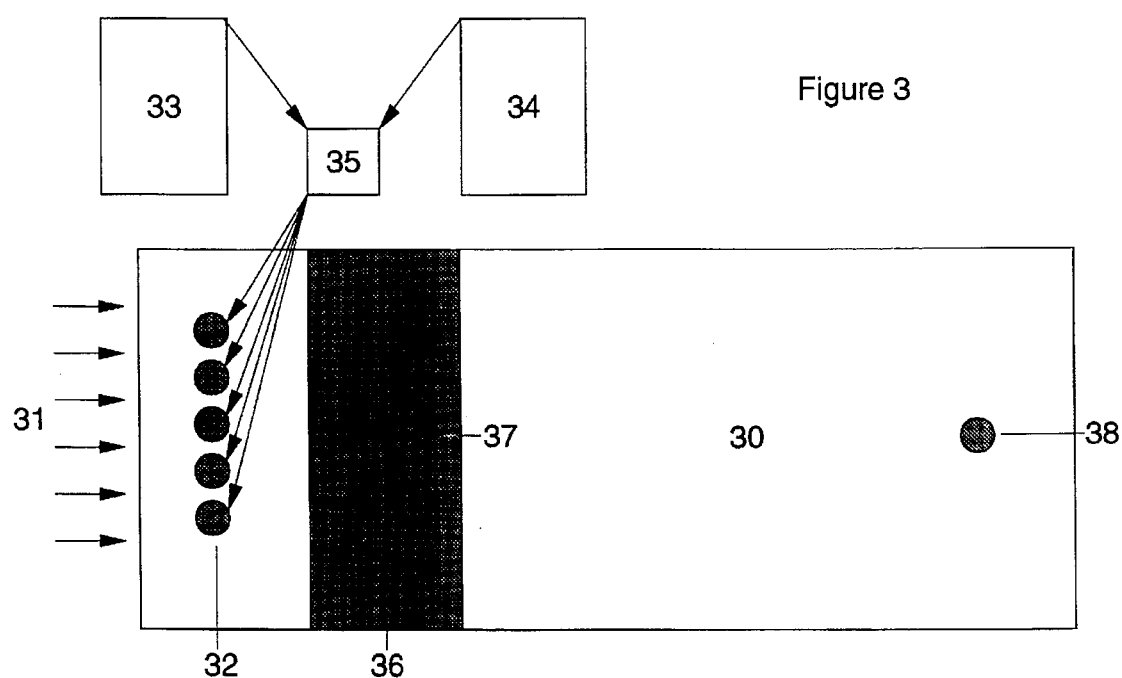
FIG. 3 is a schematic illustration of the method according to the present invention for a subterranean application of the process to reductively dehalogenate contaminated ground water passing through the soil.

FIG. 3 illustrates a method according to the present invention to reductively dehalogenate contaminated ground water passing through the soil. In FIG. 3, numeral 21 represents a parcel of soil through which contaminated ground water 31 is passing. According to the present invention means are provided for introducing a reduced titanium mixture 33 and corrin or porphyrin catalyst 37 into contact with the contaminated ground water. In FIG. 3 one or more injection wells 32 are illustrated as the means for introducing the reduced titanium mixture into contact with the contaminated ground water. In this manner, the injection wells 32 will preferably penetrate through the soil and into the source of contamination. The injection wells 32 may comprise any suitable means for dispensing the titanium mixture into the soil and may include, for example, apertured hollow tubes (not shown) or any other suitable means for dispersing the fluid into the soil. The reduced titanium mixture 33 is mixed with a pH adjusting solution 34 in mixing chamber 35. The mixture is then pumped into injection wells 32. The reduced titanium mixture 33 is preferably a titanium carboxylic acid derivative in solution such as titanium oxalate, titanium nitriloacetate or titanium citrate. The pH adjusting solution 34 preferably is a solution of sodium citrate and sodium carbonate or the like. The sodium carbonate acts as a buffer to adjust the pH of the titanium mixture 33 above pH 7. The sodium citrate interacts with the minerals such as calcium in the ground water to help maintain the titanium in solution. Without the sodium citrate the titanium mixture 33 would react with the minerals in the ground water and be precipitated.

A porous reactive wall 36, as shown in FIG. 3 may be constructed downstream from wells 32 to provide a site of reaction for the contaminants. In this embodiment of the invention only the reduced titanium mixture, preferably titanium oxalate, would be pumped into wells 32. The porous reactive wall 36 contains a corrin or porphyrin catalyst 37 preferably vitamin B12. To minimize loss of catalyst by dissolution in the ground water, the vitamin B12 is preferably absorbed on a solid support which will release the catalyst slowly. It has been found that octadecylsilane silica (C18 silica) granules provide a suitable support and when further mixed with sand and gravel provide an effective reactive wall. The passage of the contaminated ground water in contact with the titanium oxalate and the catalyst in the porous reactive wall 36 results in reductive dehalogenation. The oxidized titanium may be withdrawn by withdrawal well 38 located downstream from the porous reactive wall 36. As an alternative to injection wells 32, the reduced titanium mixture can be injected into the reactive wall 36.

Illustrative of the practical application of the present invention, the following laboratory examples outline the steps of the present invention.

EXAMPLE 1

Octadecylsilane silica (also referred to as C18 silica) was prepared for use with methanol and then water according to the manufacturer's specifications and subsequently placed in a column. A 100 $mgL^{-1}$ solution of vitamin B12 in reduced titanium citrate was percolated through the C18 bed. When saturated, as was evident from the dark orange colour of the resin, it was mixed with wet sand to the desired final concentration of between about 1% to about 5%. The reactive mixture was then placed as a layer in a column filled with sand.

Figure 4:
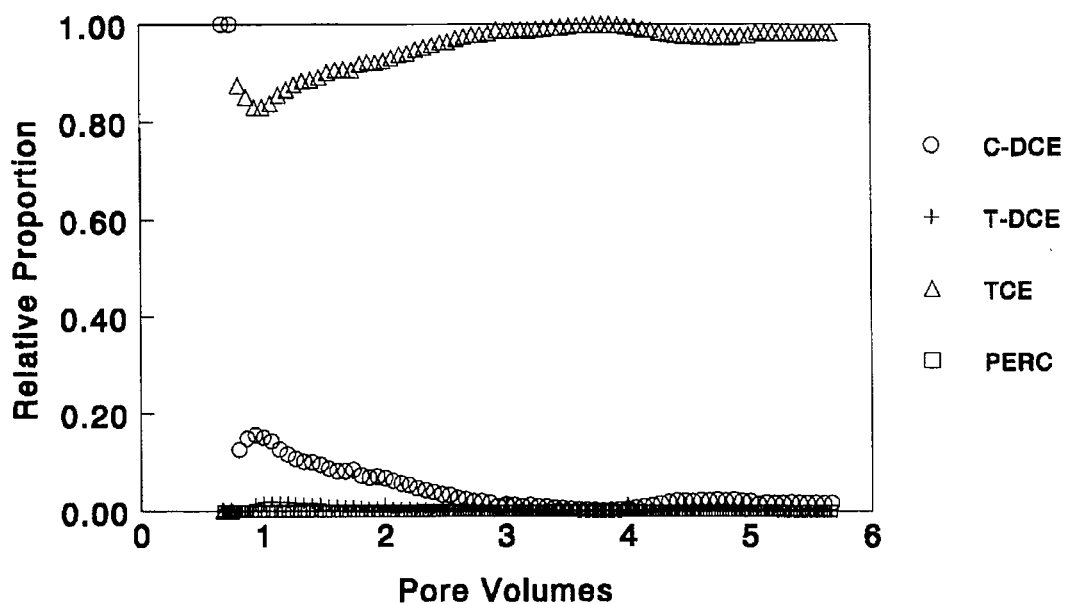
FIG. 4 is a graphical representation of results of the testing of tetrachloroethylene according to the present invention.

A small generator column containing 100 µL of the compound to be treated was placed ahead of the sand column. A solution of the titanium citrate was pumped through the column. The chlorinated compound was dissolved slowly to form a concentrated solution which started to be degraded once it came into contact with the reactive sand/immobilized vitamin B12 mixture. The residence time in the soil column was five hours. The eluent was found to be titanium (III) citrate in TRIS buffer at pH 8. Based on the data illustrated in FIG. 4 with the ordinate denoting the relative proportion of unreacted tetrachloroethylene and the products formed as measured at the column outlet. The abscissa denotes the number of pore volumes of eluent passed through the column. The proportion of the products did not change over time, showing the stability of the process. The graph shows the composition of the mixture after five hours of reaction. The flow was stopped and the reaction allowed to continue for two days. When the flow was resumed, mostly ethane and ethene were measured, showing that the process results in complete dechlorination.

EXAMPLE 2

Titanium metal (20g) in the form of titanium sponge was placed at the bottom of a 250 milliliter Erlenmyer flask which was filled with a 4% solution of oxalic acid and allowed to stand partially covered for approximately four days. During the dissolution of the metal, a strong yellow/brown colour developed. The titanium oxalate thus formed was substituted for the titanium chloride in the titanium citrate buffer used in Example 1 with vitamin B12 and essentially gave to yield the same results.

Figure 5:
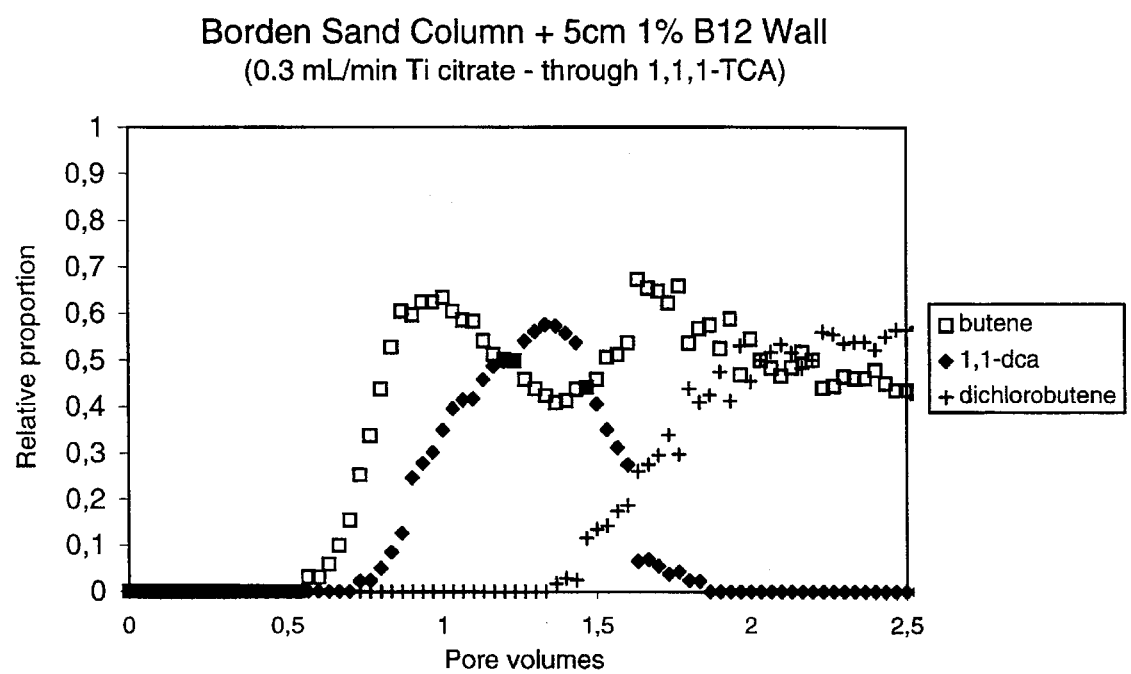
FIG. 5 is a graphical representation of the results obtained for TCA.

FIG. 5 illustrates the results generated with the solvent being 1,1,1-TCA. The product of the dechlorination was 1,1 dichloroethane, butene and dichlorobutene. The column data was the same for the parameters set forth with respect to FIG. 4. Flow rate in the case of the data for FIG. 5 was 0.3 $mL^{-1}$.

Other data for halogenated organic compounds was conducted and in the case of chlorofluorocarbons, experimentation was performed with CFC-113 (1,1,2-trichloro-1,2,2-trifluoroethane). The result of the experimentation indicated that the major product was trifluoroethene. The methods of the present invention also constitute a potential method of recycling the now banned CFC-113 into fluoro carbons.

HCFC-123 (2,2-dichloro 1,1,1-trifluoroethane) resulted in the production of HCFC-1122 (2-chloro-1,1-difluoroethane) and some HCFC-133 (2-chloro-1,1,1-trifluoroethane).

A solution of a mixture of PCB'S were placed in a vial with immobilized vitamin B12 and a reduced titanium oxalate solution. Extraction after 1 month showed substantial formation of dechlorination products.

Based on the experiments that were conducted, the reaction of vitamin B12 not only is a reductive dechlorination process but further results in the elimination for reduction and dimerization of the initial compound.

It will be appreciated that the above description related to the preferred embodiment by way of example only. Many variations on the invention will be obvious to those knowledgeable in the field, and such obvious variations are within the scope of the invention as described and claimed, whether or not expressly described.

What is claimed as the invention is:

1. A method of anaerobic treatment of soil, ground water or industrial effluent contaminated with halogenated organic compounds, said method comprising contacting the soil, ground water or industrial effluent with a reduced titanium mixture which is not hazardous to the environment in the presence of a catalytic amount of corrin or porphyrin catalyst to reductively dehalogenate the organic contaminants wherein the reduced titanium mixture is a titanium oxalate solution.

2. The method of claim 1 wherein the titanium oxalate solution is generated on site by applying a solution of oxalic acid to titanium metal.

3. The method of claim 1 wherein the catalyst is a corrin selected from the group consisting of cyanocobalamin (ie. vitamin B12), aquocobalamin, methylcobalamin, adenosylcobalamin, (cyanoaquo)cobinamide, (methylaquo) cobinamide and (cyanoaquo) trimethylbenzimidazoylcobamide or a porphyrin selected from the group consisting of hemoglobin, hemin, hematin, chlorophyll a, cobalt protoporphyrin, iron protoporphyrin, magnesium protoporphyrin, nickel protoporphyrin, vanadium protoporphyrin and cobalt phthalocyanine.

4. The method of claim 3 wherein the catalyst is vitamin B12.

5. The method of claim 4 for in-situ treatment of soil contaminated with undissolved halogenated organic compounds wherein the titanium oxalate solution and vitamin B12 are pumped into the soil to reductively dehalogenate the undissolved halogenated organic compounds.

6. The method of claim 1 for reductively dehalogenating ground water or industrial effluent contaminated with halogenated organic compounds, said method performed in-situ or above ground comprising contacting the contaminated ground water or effluent with the reduced titanium mixture and then passing the ground water or effluent through a filter bed or porous reactive wall containing the corrin or porphyrin catalyst for reductive dehalogenation of the organic compounds wherein the reduced titanium mixture is a titanium oxalate solution.

7. The method of claim 6 wherein the titanium oxalate solution is generated on site by applying a solution of oxalic acid to titanium metal.

8. The method of claim 6 wherein the catalyst is a corrin selected from the group consisting of cyanocobalamin (ie.

vitamin B12), aquocobalamin, methylcobalamin, adenosylcobalamin, (cyanoaquo)cobinamide, (methylaquo) cobinamide and (cyanoaquo) trimethylbenzimidazoylcobamide or a porphyrin selected from the group consisting of hemoglobin, hemin, hematin, chlorophyll a, cobalt protoporphyrin, iron protoporphyrin, magnesium protoporphyrin, nickel protoporphyrin, vanadium protoporphyrin and cobalt phthalocyanine.

9. The method of claim 8 wherein the catalyst is immobilized on a solid support.

10. The method of claim 9 wherein the solid support is a hydrophobic organic polymers such as styrene-divinyl benzene, XAD resins or Tenax, pure or coated on an inorganic solid such as silica sand or graphitized carbon.

11. The method of claim 10 wherein the solid support is silica modified with octadecylsilane (C18 silica).

12. The method of claim 9 wherein the catalyst is vitamin B12.

13. The method claim 5 wherein said soil contains a population of microorganisms which are capable of degrading or decomposing the halogenated organic contaminants and said titanium oxalate solution and vitamin B12 are non-toxic to the said population of microorganisms thereby enhancing microbial degradation of halogenated organic contaminants present in said soil.

* * * * *